(12) United States Patent
Gieseke et al.

(10) Patent No.: US 8,088,162 B1
(45) Date of Patent: Jan. 3, 2012

(54) MEMBRANE PUMP FOR SYNTHETIC MUSCLE ACTUATION

(75) Inventors: Thomas J. Gieseke, Newport, RI (US); Charles J. Patrissi, Newport, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 177 days.

(21) Appl. No.: 12/460,907

(22) Filed: Sep. 28, 2009

(51) Int. Cl.
*A61F 2/08* (2006.01)
(52) U.S. Cl. .................................................. 623/14.13
(58) Field of Classification Search ................ 623/14.13; 310/363
See application file for complete search history.

(56) References Cited

U.S. PATENT DOCUMENTS

| | | | |
|---|---|---|---|
| 4,522,698 A * | 6/1985 | Maget | 204/265 |
| 5,268,082 A * | 12/1993 | Oguro et al. | 204/282 |
| 5,389,222 A * | 2/1995 | Shahinpoor | 310/309 |
| 5,671,905 A * | 9/1997 | Hopkins, Jr. | 251/129.01 |
| 6,405,532 B1 * | 6/2002 | Shahinpoor et al. | 60/512 |
| 7,511,402 B2 * | 3/2009 | Ito et al. | 310/300 |
| 7,602,098 B2 * | 10/2009 | Ide | 310/311 |

* cited by examiner

*Primary Examiner* — Bruce E Snow
(74) *Attorney, Agent, or Firm* — James M. Kasischke; Jean-Paul A. Nasser; Michael P. Stanley

(57) ABSTRACT

A synthetic muscle comprises an outer layer having an interior filled with a proton containing electrolyte. A first electrode extends into the interior, and a second electrode extends through the interior. The second electrode is attached to the outer layer at two locations. An ion selective microporous membrane extends through the interior along the length of the second electrode and is also attached to the out layer at the two locations. The ion selective membrane is also attached to the second electrode at a plurality of points along its length, defining a plurality of pockets of the ion selective membrane. The ion elective membrane is generally disposed between the two electrodes. The two electrodes are in communication through a power source. Using the power source, an electroosmotic flow is established across the ion exchange membrane from the first electrode to the second electrode, inflating the pockets and constricting the outer layer.

12 Claims, 3 Drawing Sheets

MEMBRANE PUMP FOR SYNTHETIC MUSCLE ACTUATION

STATEMENT OF GOVERNMENT INTEREST

The invention described herein may be manufactured and used by or for the Government of the United States of America for Governmental purposes without the payment of any royalties thereon or therefor.

CROSS REFERENCE TO OTHER PATENT APPLICATIONS

None.

BACKGROUND OF INVENTION

1) Field of the Invention

The present invention is directed to synthetic muscles and methods for actuating synthetic muscles.

2) Description of Prior Art

Synthetic muscle has been developed that uses inflatable balloons to produce a tensile force from a positive pressurization. Mechanical supply and ducting is used to provide the required pressurization. However, the mechanical supply and ducting that is currently used is limited in several respects. First, the required piping system can become very complex if a multitude of small fibers is needed for a particular application. Second, moving fluid from a central supply to small individual cells via small ductwork is prone to mechanical losses. Third, finding an optimum balance between time required to move fluid from a central supply to the cells, supply pressure and mechanical integrity of the ducting system could be problematic. For example, large ducting and cell volumes can lead to lengthy times required to fill the cells and consequently limit the effective system actuation rates.

To optimize rate of actuation, it is desirable to minimize the cell volume and to maximize the area through which fluid is forced into the cell. Ideally, a fully closed cell that is inflated through some mass transfer process that takes place through the cell boundary would lead to a maximum cell response rate. With such a system, the transfer rate would scale with the cell surface area, i.e., square of diameter, and the fill-volume of the cell would scale with the cube of the diameter. The time required to fill the cell is the volume divided by the rate, which scales as the diameter of the cell. It follows that as the dimensions of the individual cells is reduced, the time required to fill the cell is proportionately reduced, i.e. very small cells fill very rapidly.

To make use of this aspect of miniaturization, a method is needed to move the working fluid through the cell walls.

SUMMARY OF THE INVENTION

Systems and methods in accordance with exemplary embodiments of the present invention are directed to the actuation of synthetic muscle fibers. An ionic-selective membrane pump to inflate balloons attached end to end in a chain. This actuation system offers advantages over the mechanical and chemical reaction actuation methods, because this actuation system has a very simple design, no moving parts and can be readily miniaturized for optimal system performance.

In accordance with one exemplary embodiment, the present invention is directed to a synthetic muscle having an outer layer forming a closed shape and having an interior. In one embodiment, the outer layer is a non-permeable encapsulation material. An electrolyte, for example, a proton containing electrolyte, fills the interior. A first electrode passes through the outer layer and extends into the interior. In addition, a second electrode passes through the outer layer and extends through the interior. The second electrode is fixedly attached to the outer layer at two points. The second electrode does not move with respect to the outer layer at these two points. In one embodiment, the first electrode is an anode, and the second electrode comprises a cathode. In another embodiment, the first and second membranes are electro-chemically reversible materials to facilitate reversal of charged particle flow through an ion exchange membrane.

The synthetic muscle also includes an ion exchange membrane disposed within the interior between the first and second electrodes. The ion exchange membrane is attached to the second electrode at a plurality of locations along a length of the second electrode between the two points of attachment of the second electrode to the outer layer. In one embodiment, the ion exchange membrane is a cationic selective membrane. In another embodiment, the ion exchange membrane is a microporous membrane containing a polymer having charged pendant groups to provide a wall charge within each microchannel. The charged pendant groups include pendent sulfonic acid groups. In one embodiment, the polymer is a sulfonated tetrafluorethylene copolymer. In one embodiment, the ion exchange membrane is a tubular sleeve, and the second electrode extends through the tubular sleeve. The plurality of locations at which the ion exchange membrane is attached to the second electrode defines a plurality of distinct pockets of the ion exchange membrane. In one embodiment, the ion exchange membrane extends through the interior of the outer layer and is attached to the outer layer at the points of attachment of the second electrode to the outer layer.

The synthetic muscle also includes a power source in communication with both the first and second electrodes to provide the necessary power to the electrodes.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals and symbols designate identical or corresponding parts throughout the several views and wherein.

DETAILED DESCRIPTION OF THE INVENTION

Exemplary embodiments of systems and methods in accordance with the present invention utilize an electro-osmotic membrane pump to achieve transport of fluid across the cell boundaries. In one embodiment, cell walls are constructed of a semi-permeable membrane material that allows certain ions to pass through while restricting the passage of other ions. An electrical potential is applied across the membrane, for example, by introduction of an anode and cathode on opposite sides of the membrane, and select charged ions pass through the membrane in the direction of the electrical field lines. The bulk movement of fluid from one side of the boundary to the other inflates the cell.

Figure 1:
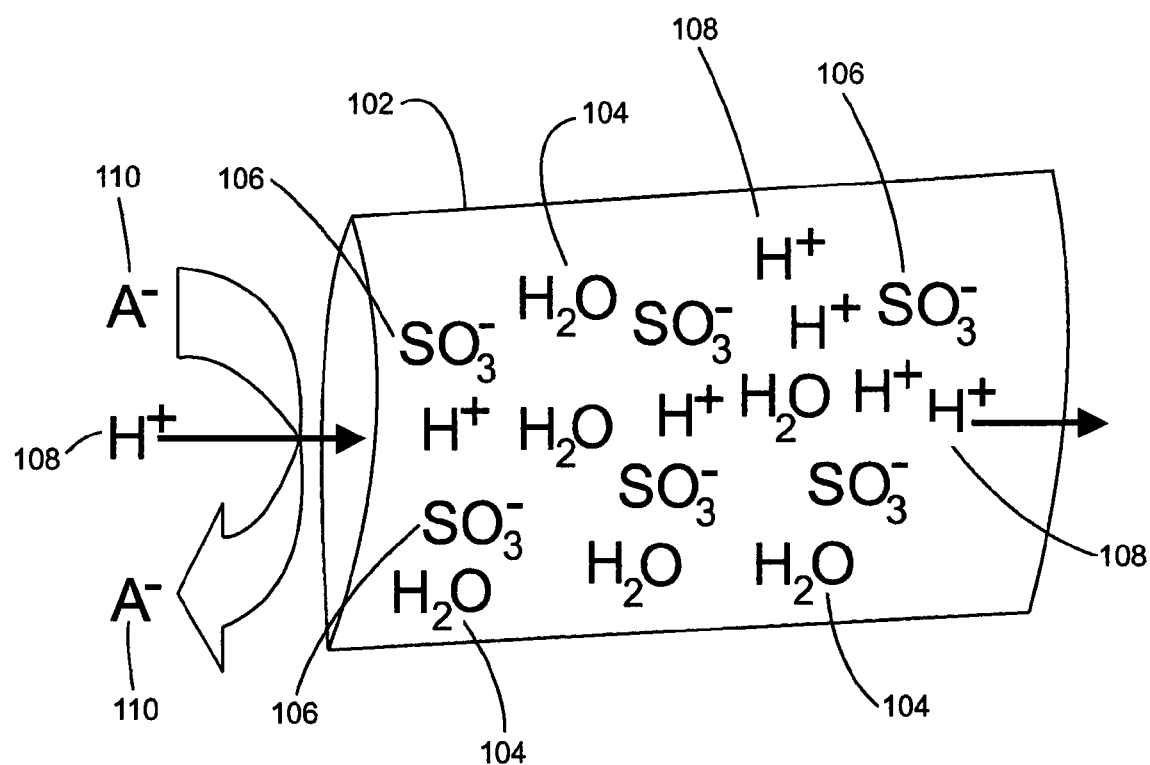
FIG. 1 is a schematic representation of a microchannel in a microporous ion exchange membrane in accordance with the present invention.

Referring to FIG. 1, an example of a microchannel 102 in a microporous cation exchange membrane is illustrated. In one embodiment, the cation exchange membrane includes pores of about 4 nm connected by channels about 1 nm in diameter. The microchannel 102 includes water molecules ($H_2O$) 104 and pendent sulfonic acid groups ($SO_3^-$) 106. Protons ($H^+$) 108 permeate through the microchannel 102, and anions ($A^-$) 110 are rejected due to electrostatic interactions with the pendent $SO_3^-$ groups 106 in the channel 102.

Figure 2:
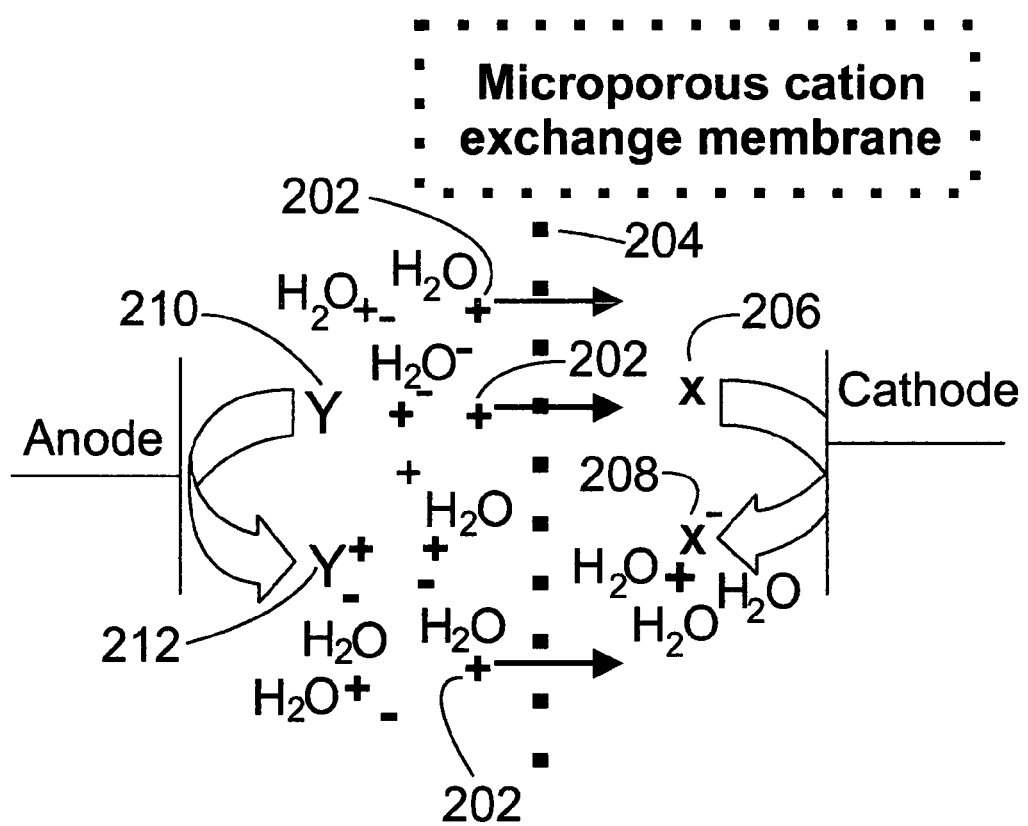
FIG. 2 is a schematic representation of the flow of ions across a microporous cation exchange membrane in accordance with the present invention.

Referring to FIG. 2, the diffusion of protons (+) 202 through a microporous cation exchange membrane 204 is illustrated. This diffusion occurs during the reduction of X 206 to $X^-$ 208 and the oxidation of Y 210 to $Y^+$ 212.

Suitable materials for the cation exchange membrane provide for the desired pendent groups in the microporous channel. In accordance with one embodiment of the present invention, the pendent group is the anionic sulfonic acid group, and the cation exchange membrane is constructed from a sulfonated tetrafluorethylene copolymer commercially available under the Tradename Nafion™ from E. I. du Pont de Nemours and Company of Wilmington, Del. This is an ion exchange membrane containing microporous channels with anionic sulfonic acid groups ($SO_3^-$) connected to the walls of the microchannels. These sulfonic acid groups reject the passage of other anions due to charge effects and, therefore, allow permeation of only cations.

Nafion™ is a common membrane used to separate the anode and cathode compartments of aqueous electrochemical cells such as fuel cells and electrolytic cells. During the flow of current, protons and other cations travel through the membrane toward the cathode in order to maintain electroneutrality, as illustrated, for example, in FIG. 2. As illustrated, the positive ions 202 are shown moving through the membrane to the cathode during reduction of X 206 to $X^-$ 208. Reduction causes an electrochemical potential that is a strong driving force for cation movement through the membrane to the cathode. The movement of protons through ion exchange membranes, e.g., Nafion™, in aqueous acidic electrolytes is rapid. In aqueous electrolytes, protons are surrounded by a hydration shell of 3 to 5 water molecules. Therefore, the applied current brings protons and water through the membrane to the cathode. This movement of water across the membrane during the application of current is called electroosmotic flow (EOF). The rate of water flow through the membrane is directly related to the magnitude of the current. Exemplary embodiments of systems and methods in accordance with the present invention utilize EOF to control the action of synthetic muscles.

Figure 3:
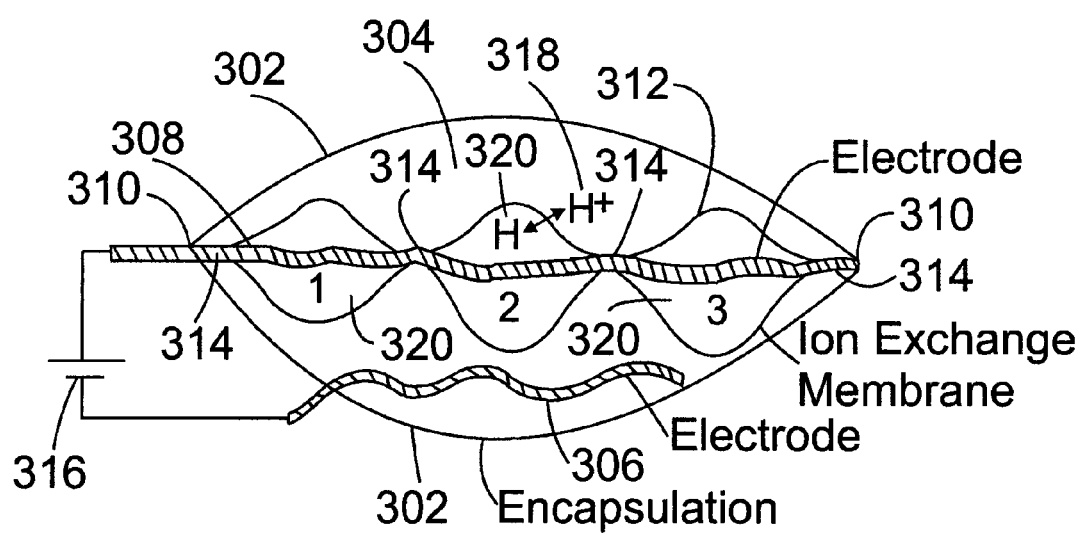
FIG. 3 is a schematic representation of an embodiment of a muscle equipped to use electroosmotic flow in accordance with the present invention.

Referring to FIG. 3, an embodiment of a synthetic muscle 300 in accordance with the present invention is illustrated. The synthetic muscle includes an outer layer 302 of a non-permeable, flexible encapsulation material. Suitable encapsulation materials are found in the food packaging and lithium battery industries where moisture and oxygen exclusion, as well as package flexibility, are important. In one embodiment, these materials are a laminate of polymers and metal foil, e.g., aluminum foil. Suitable flexible barrier materials are commercially available from Pliant Corporation of Schaumburg, Ill.

The outer layer 302 is constructed in accordance with the desired overall shape and size of the muscle. Because the material is flexible, the size and shape of the outer layer can be conformal of the requirements of the muscle. The arrangement can be a single pieces or a plurality of pieces heat sealed together depending on the muscle's requirements and preference of the design engineer. Disposed within the interior 304 non-permeable encapsulation material is an electrolyte, preferably a proton containing electrolyte. Suitable proton containing electrolytes include, but are not limited to, dilute acids, such as $H_2SO_4$, HCl, HI, HBr and $H_3PO_4$. Other electrolytes include those that dissolve readily in water and have a cation with a significant hydration shell that also has good mobility through Nafion® or other cation exchange membranes. In an alternate embodiment, an anion exchange membrane based muscle is used. This embodiment is similar to the one described above except the ion-selective membrane 312 transports anions and rejects cations. An example of a suitable anion exchange membrane is commercially available from Membranes International, Inc. of Glen Rock, N.J. These membranes function via transport of anions though a membrane.

Other suitable electrolytes includes, but at not limited to any solution containing $Na^+$, $K^+$ and $Cl^-$ ions, where the solvent is water. A first electrode 306 extends through the non-permeable encapsulation membrane 302 and into the interior of the outer layer 302. The first electrode is suspended in the electrolyte. A second electrode 308 also extends through the non-permeable encapsulation membrane and into the interior of the outer layer 302 and is also suspended in the electrolyte. The second electrode is attached to the encapsulation membrane of the outer layer 302 at two locations 310, preferably on either end of the length of the second electrode 308 that extends through the interior 304 of the encapsulation membrane 302. These two points of attachment 310 are preferably disposed on opposite sides or ends of the encapsulation membrane. The second electrode 308 is fixedly attached to the outer layer 302 and does not move with respect to the outer layer 302.

In one embodiment, the first electrode 306 is the anode and the second electrode 308 is the cathode. The ion-selective membrane is cationic selective membrane. In another embodiment, the first electrode 306 is the cathode, and the second electrode 308 is the anode. Suitable materials for the anode include, but are not limited to, carbon, platinum, zinc, magnesium, manganese, aluminum, silver, silver/silver chloride and combinations thereof. Preferably, the anode is constructed from carbon or platinum as these materials do not corrode in an aqueous electrolyte. Materials that corrode in an aqueous electrolyte are generally not reversible. Therefore, the muscle would function until all the anode material is consumed. Suitable materials for the cathode include, but are not limited to carbon, platinum, zinc, magnesium, manganese, aluminum, silver, silver/silver chloride and combinations thereof. As with the anode, the cathode material is preferably carbon or platinum. In general, compatible cathode and anode pairs are selected for the electrodes. In one embodiment, the first and second electrodes are constructed from electro-chemically reversible materials to facilitate reversal of the charged particle flow through the ionic membrane.

An ion exchange membrane 312 is provided in the interior 304 of the encapsulation membrane outer layer 302 and completely surrounds or encases the second electrode 308. Therefore, the ion exchange-membrane 312 is disposed between the second electrode 308 and any portion of the first electrode 306 or the outer layer 302 except where the second electrode 308 is in fixed to the outer layer 302. In general, the ion exchange membrane 312 separates the first and second electrodes. Suitable materials for the ion exchange membrane 312 are discussed above. Preferably, the ion exchange membrane is Nafion™. The electrolyte is disposed on either-side of the ion exchange membrane 312. The ion exchange membrane 312 is attached to the second electrode 308 at a plurality of points 314 along the length of the second electrode 308. This attachment forms discrete pockets 320 of the ion exchange membrane 312 or pillows, each containing a length of the second electrode 308. The second electrode 308 and the ion exchange membrane 312 do not move with respect to each other at these points of attachment. Adjacent pockets are in ionic contact. The ion exchange membrane 312 can also be attached to the out layer 302 at two points corresponding to the point of attachment of the outer layer 302 and the second electrode 308. In one embodiment, the ion exchange membrane 312 is arranged as a tubular sleeve, and the second electrode 308 passes through and along the interior of the sleeve.

The first and second electrodes are both in contact with and in communication through a power source 316 located external to the encapsulation membrane 302. Suitable power sources include, but are not limited to, a battery with an electronics package that controls electrode voltage and current and a 120 V AC source, again with an appropriate electronics package to control voltage and current. Preferably, the power source 316 can be operated to switch or reverse the polarity or flow of protons through the electrodes. Under an applied current from the power source 316, protons 318 move to the second electrode 308 through the ion exchange membrane 312. The resulting EOF inflates the discrete pockets 320. As the pockets 320 inflate, attachment points 314 are drawn together, and the second electrode 308, which is attached to the ion exchange membrane 312 at the plurality of attachment points 314, is reduced in length. Since the second electrode 308 is also attached to the encapsulation membrane outer layer 302, a reduction in the length of the second electrode 308 draws the connection points 310 together, expanding the outer layer 302 outward. This results in a constricting of the muscle. Relaxation of the muscle is accomplished by reversing the polarity of the current, making the first electrode 306 the cathode and the second electrode 308 the anode.

The $VO^{2+}/V^{3+}$ electrochemical couple $VO^{2+}+2H^++e \leftrightarrow V^{3+}+H_2O$, $E^o=0.337V$ vs. SHE, can be used to inflate and deflate the pockets 320. This reaction decreases the net positive charge in the cathode compartment, drawing protons across the membrane 312. At the anode, $V^{3+}$ would be oxidized with a net increase in positive charge (3+ to 4+). This would accommodate the anion left behind by the diffusing proton, maintaining electroneutrality in the anode compartment.

The embodiments as illustrated above utilize electro-osmotic flow driven by the reduction of X to $X^-$. This is called a faradaic process, i.e., electron transfer. In an alternative embodiment, EOF is driven by a non faradaic process, such as happens in electrochemical capacitors. In this embodiment, electrons flow to the cathode and holes flow to the anode. The electrons reside on the surface of the cathode but do not transfer to any species in solution. To balance electrode charge, counterions migrate to the electrode surface. The result is transport of cations, like described above. The mechanism, however, is slightly different.

It will be understood that many additional changes in details, materials, steps, and arrangements of parts which have been described herein and illustrated in order to explain the nature of the invention, may be made by those skilled in the art within the principle and scope of the invention as expressed in the appended claims.

What is claimed is:

1. A synthetic muscle comprising:
an outer layer forming a closed shape and having an interior;
an electrolyte filling the interior;
a first electrode passing through the outer layer and extending into the interior;
a second electrode passing through the outer layer and extending through the interior, the second electrode attached to the outer layer at two points;
an ion exchange membrane disposed within the interior between the first and second electrodes, the ion exchange membrane attached to the second electrode at a plurality of locations along a length of the second electrode between the two points of attachment of the second electrode to the outer layer, wherein the ion exchange membrane comprises a microporous membrane comprising a polymer having charged pendant groups to provide a wall charge within each microchannel; and
a power source in communication with both the first and second electrodes.

2. The synthetic muscle of claim 1, wherein the outer layer comprises a non-permeable encapsulation material.

3. The synthetic muscle of claim 1, wherein the electrolyte comprises a proton containing electrolyte.

4. The synthetic muscle of claim 1, wherein the first electrode comprises an anode and the second electrode comprises a cathode.

5. The synthetic muscle of claim 1, wherein the first and second electrodes comprise electro-chemically reversible materials to facilitate reversal of charged particle flow through the ion exchange membrane.

6. The synthetic muscle of claim 1, wherein the ion exchange membrane comprises a cationic selective membrane.

7. The synthetic muscle of claim 1, wherein the charged pendant groups comprise pendent sulfonic acid groups.

8. The synthetic muscle of claim 1, wherein the polymer comprises a sulfonated tetrafluorethylene copolymer.

9. The synthetic muscle of claim 1, wherein the ion exchange membrane comprises a tubular sleeve and the second electrode extends through the tubular sleeve, the plurality of locations at which the ion exchange membrane is attached to the second electrode defining a plurality of distinct pockets of the ion exchange membrane.

10. The synthetic muscle of claim 1, wherein the ion exchange membrane extends through the interior of the outer layer and is attached to the outer layer at the points of attachment of the second electrode to the outer layer.

11. A synthetic muscle comprising:
an outer layer forming a closed shape and having an interior;
an electrolyte filling the interior;
a first electrode passing through the outer layer and extending into the interior;
a second electrode passing through the outer layer and extending through the interior, the second electrode attached to the outer layer at two points;
an ion exchange membrane disposed within the interior between the first and second electrodes, the ion exchange membrane attached to the second electrode at a plurality of locations along a length of the second electrode between the two points of attachment of the second electrode to the outer layer wherein the ion exchange membrane comprises a tubular sleeve and the second electrode extends through the tubular sleeve, the plurality of locations at which the ion exchange membrane is attached to the second electrode defining a plurality of distinct pockets of the ion exchange membrane; and a power source in communication with both the first and second electrodes.

12. A synthetic muscle comprising:

an outer layer forming a closed shape and having an interior;

an electrolyte filling the interior;

a first electrode passing through the outer layer and extending into the interior;

a second electrode passing through the outer layer and extending through the interior, the second electrode attached to the outer layer at two points;

an ion exchange membrane disposed within the interior between the first and second electrodes, the ion exchange membrane attached to the second electrode at a plurality of locations along a length of the second electrode between the two points of attachment of the second electrode to the outer layer, wherein the first and second electrodes comprise electro-chemically reversible materials to facilitate reversal of charged particle flow through the ion exchange membrane; and a power source in communication with both the first and second electrodes.

* * * * *